United States Patent
Zhou et al.

(10) Patent No.: US 10,073,904 B2
(45) Date of Patent: Sep. 11, 2018

(54) EVENT TRIGGERED SERVICE FOR THE LIGHTWEIGHT DIRECTORY ACCESS PROTOCOL

(71) Applicant: Verizon Patent and Licensing Inc., Basking Ridge, NJ (US)

(72) Inventors: Bin Zhou, Malvern, PA (US); Frank E. Meador, III, Eldersburg, MD (US); Mala Acharya, Colorado Springs, CO (US); Jamal A. Alvi, Mullica Hill, NJ (US)

(73) Assignee: Verizon Patent and Licensing Inc., Basking Bridge, NJ (US)

( * ) Notice: Subject to any disclaimer, the term of this patent is extended or adjusted under 35 U.S.C. 154(b) by 330 days.

(21) Appl. No.: 14/072,265

(22) Filed: Nov. 5, 2013

(65) Prior Publication Data
US 2015/0127678 A1 May 7, 2015

(51) Int. Cl.
*G06F 17/30* (2006.01)
*H04L 29/08* (2006.01)
*H04L 12/58* (2006.01)

(52) U.S. Cl.
CPC .. *G06F 17/30589* (2013.01); *G06F 17/30545* (2013.01); *H04L 67/06* (2013.01); *H04L 51/046* (2013.01); *H04L 67/1004* (2013.01)

(58) Field of Classification Search
CPC ............... H04L 67/06; H04L 67/1004; G06F 17/30545
USPC ......................................................... 707/770
See application file for complete search history.

(56) References Cited

U.S. PATENT DOCUMENTS

| | | | |
|---|---|---|---|
| 6,769,011 B1 * | 7/2004 | Desrochers et al. | 709/203 |
| 7,275,073 B2 * | 9/2007 | Ganji et al. | 707/621 |
| 8,346,958 B2 | 1/2013 | Aschen et al. | |
| 2002/0138489 A1 * | 9/2002 | Trivedi et al. | 707/10 |
| 2003/0204624 A1 * | 10/2003 | Kushner | 709/242 |
| 2004/0205048 A1 * | 10/2004 | Pizzo et al. | 707/3 |
| 2007/0198602 A1 * | 8/2007 | Ngo | G06F 3/061 |
| 2009/0292675 A1 * | 11/2009 | Matthiesen et al. | 707/3 |
| 2013/0179560 A1 * | 7/2013 | Kumar et al. | 709/224 |

\* cited by examiner

*Primary Examiner* — Augustine Kunle Obisesan
*Assistant Examiner* — Lahcen Ennaji

(57) ABSTRACT

A method and system for notifying a destination when information within a database that is accessible from an LDAP server has been changed, e.g., information within the database has been added, updated, or deleted. The method and system persistently searches the database to identify change events to entries in the database. It is then determined whether each of the plurality of change events have been previously transmitted to a corresponding destination. For each of the plurality of change events that have not been previously transmitted to the corresponding destination, the method and system (1) determine a change type associated with the change event that has not been previously transmitted to the destination; (2) identify a destination to be notified of the determined change type; and (3) transmit, to the destination, a message containing information including at least the change type and the corresponding change event that has not been previously transmitted to the destination.

20 Claims, 7 Drawing Sheets

300

| Change Log Entries | | | | |
|---|---|---|---|---|
| Change Number | Distinguished Name (DN) | Change Time | Change Type | Change |
| 7777 | vzeid=12345678, ou=People, o=verizon.com | 20130610132628Z | modify | replace:cn cn:John Doe add:mobile mobile: 555-555-5555 |
| 8888 | vzeid=12345679, ou=People, o=verizon.com | 20130610132638Z | delete | -- |

FIG. 3

EVENT TRIGGERED SERVICE FOR THE LIGHTWEIGHT DIRECTORY ACCESS PROTOCOL

BACKGROUND

Many organizations have implemented a lightweight directory access protocol (LDAP) for accessing and managing information directories or other similar information databases in a network. LDAP information directories are structured as a tree hierarchy, which includes a root directory, as well as directories for divisions and/or departments within the LDAP organization. The tree hierarchy may also include information about individuals, files, shared resources, etc.

An LDAP directory can be distributed among many servers. Each server can have a replicated version of the entire LDAP directory, which may be synchronized periodically. The LDAP server can receive requests from one or more users and coordinate responses to each respective user. The type of requests may include requests to read, update, and delete information stored on the LDAP server. The number of requests received from the LDAP server, and the order in which the requests are carried out, may vary between servers. Any number of authorized or unauthorized persons may send requests to the LDAP server.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a simplified table showing examples of information contained within a change log database.

DETAILED DESCRIPTION

Figure 1:
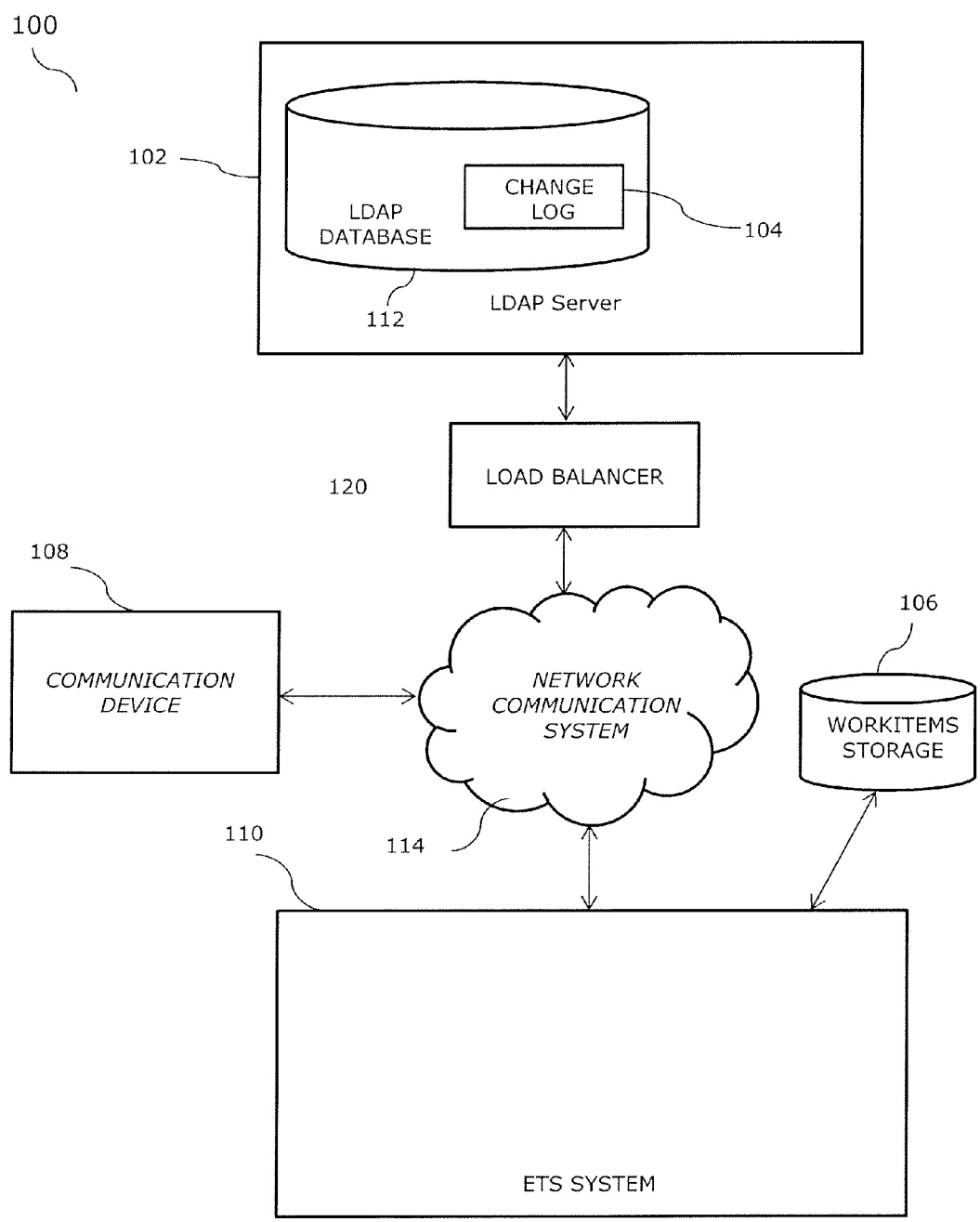
FIG. 1 is a high-level functional block diagram of an example of an event triggered services (ETS) system communicating with a lightweight directory access protocol (LDAP) server via a network communication system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The Lightweight Directory Access Protocol (LDAP) is an application layer protocol for network access directory information services, such as telephone and/or address directories, user sign-on databases or the like. Information within a database accessed by an LDAP server, or the like, may be changed. Examples of these changes include information being added, updated, deleted, and such, within the database.

Users may desire to obtain information about changes to information within the database accessible via an LDAP server, for example. Users may desire to know when, and how, etc., information within the database is modified, including the user being informed when information is added, modified, or deleted within the database accessible via an LDAP server. Conventionally, a user desiring to obtain information of such changes to the database may be forced to manually, and/or continuously, check the database using the LDAP to learn when, how, etc. the information was changed. This may be tedious, time consuming, and, possibly frustrating to a user. According to aspects described in this disclosure, a user is notified when information within the database is updated. According to aspects described in this disclosure, the user will be notified of such changes to the database without the need for users to perform manual and/or continuous searches using the lightweight directory access protocol. Such notification of the change event may include identifying the information that was modified in the database, how the information was modified, as well as other information relating to the change event.

The various techniques and equipment disclosed herein relate to a system and method for notifying one or more users when information stored within a database, accessible via an LDAP server, or the like, has been changed. For referencing purposes within this disclosure, a change to the information contained within the database may include information being added to the database (e.g., a database within an LDAP server), information being modified within a database, and information being deleted within a database. The disclosure may describe the database as a storage device located within an LDAP server. Those skilled in LDAP technology, however, will understand that the database may be external to the LDAP server, as well as other ways and devices in which the information may be modified, stored, and/or deleted.

As described herein, the user may be notified based on a change event (e.g., addition, deletion, modification of the information within the database). The user may be notified of this change event using many and various methods of communication, including, but not limited to, email, ftp, text messaging, etc.

FIG. 1 illustrates a system 100 for notifying a user of a communication device 108 when a change event has occurred to information within a database 112 that is accessible via LDAP server 102. As indicated above, database 112 may be located within, or outside of, LDAP server 102. Further, LDAP server may be implemented as hardware or software. Thus, FIG. 1 illustrates only one example of a system for notifying a user when a change event has occurred in a database.

System 100 includes a variety of devices, components, etc. for notifying a user's communication device 108 when a change event has occurred within database 112 accessible via LDAP server 102. FIG. 1, for example, depicts the communication device 108, database 112, an LDAP server 102, a load balancer 120, and an event-triggered service (ETS) system 110. The term server is intended to broadly represent a general class of data processing devices commonly used to run programming on a computing device. Such devices typically utilize general purpose computer hardware to perform server processing and to perform attendant communications via one or more networks. The hardware elements of such servers are conventional in nature. As indicated above, the devices, components, etc. depicted on FIG. 1 illustrate only one example. Many other examples in line with the concept described herein may exist, including, for example, multiple databases 112, multiple LDAP servers 102, multiple communication devices 108, and/or multiple ETS systems 110.

A network communication system (network) 114 may be used to facilitate communication among communication device 108, ETS system 110, database 112, and LDAP server 102, for example. The network 114, depicted in FIG. 1 shows a very simplified example of such a network. The network 114 may also facilitate similar communications for many other devices as well, including devices that do not receive notifications according to aspects described in this disclosure. Further, the network 114 may be implemented by a number of interconnected networks. In one example, the network 114 may be a public network, e.g., the Internet. In other examples, however, the network 114 may be a private network, e.g., an intranet located within a corporation. In other examples, the network 114 may be a combination of public and private networks.

One or more users may possess one or more communication devices 108 to communicate with the network 114. The communication device may be a personal computer, a laptop, a smartphone, tablet, server, or any other computing device used to communicate via the network 114. The communication device 108 includes an I/O interface for communicating with the network 114. The communication device further includes input/output devices, which include, but are not limited to, keyboards, displays, pointing devices, microphones, headsets, etc. The communication device may be used by a user to input changes to database 112 via the LDAP Server 102. Further, the communication device may be used to input other information, including queries relating to a change event to the database 112, for example, that the user desires to receive notifications about. A user of communication device 108, for example, can request from the ETS System to receive notifications when information within the database 112 is changed, e.g., added, modified, and/or deleted.

In one example, a user can input information relating to notifications of a change event that the user desires to receive directly into the database 112, accessible via the LDAP server 102. In other examples, stored information (e.g., via a file, database, etc.) may be used to input information relating to the notifications of change events that the user desires to receive. Notifications of such change events may be presented to the user via a display on the communication device 108. Inputting and outputting of such information, however, is not limited to the description above. Inputting and outputting of information may be performed using any known devices and/or methods consistent with aspects of inputting/displaying information relating to change events within the database 112.

The LDAP is an application protocol for accessing and maintaining distributed directory information services, for example, over an Internet Protocol (IP) network. Such directory information services may include an organized set of records, often with a hierarchical structure, e.g., a corporate email directory.

In one example, a user may start an LDAP session by connecting to an LDAP Server 102. In such example, the user sends an operation request to the LDAP server, and the LDAP server sends responses relating to the operation requests. Operation requests to the database 112 accessible via LDAP server 102 may include adding an entry to the database 112, modifying an entry, searching for an entry, as well as other operations. Database 112 may include one or more hard drives, or other devices, for storing information.

Database 112 may also contain a change log 104. In other examples, change log 104 may be kept in some other storage location. In the example depicted on FIG. 1, the change log 104 stores entries for change events within the database 112. Change log 104 entries may include information regarding the type of change event (e.g. addition, deletion, modification, etc.), the time/date of the change event, and the user or group affected by the change event. One example of entries stored within a change log 104 is depicted on FIG. 3. Other examples of change log 104, including other entries and attributes of information stored within database 112, will be understood by those skilled in the LDAP. As shown on FIG. 3, the change log 104 may include entries for a change number 302, a distinguished name (DN) 304, a change time 306, a change type 308, and a change 310.

Change number 302, as shown on FIG. 3, is the number, or identifier, of a particular change event. This identifier may be formed sequentially, for example, according to the introduction of the change event into the change log 104. In one example, the change number may begin at 1, and each change subsequently added to the change log may be designated with a change number that is one larger than the change event previously added to the change log 104. As an illustration, the first five change events input into a change log may have change numbers 1, 2, 3, 4, and 5, respectively. However, this is only one example of change numbers within a change log. Change numbers may be organized in many other ways, for example, by skipping numbers, etc.

The LDAP Server 102 may organize information within database 112 in a directory structure. Each entry in the directory has a distinguished name. The DN is the name that uniquely identifies an entry in the directory. Thus, distinguished name 304, as shown on FIG. 3, may be used to search the information stored within the directory structure of the database 112. A DN is made up of attribute=value pairs, separated by commas. As shown on FIG. 3, change number 7777 has a DN of vzeid=12345678, ou=People, and o=verizon.com. In this example, "vzeid" is the identification of the particular entry, "ou" is the organization unit associated with the entry, and "o" is the organization associated with the entry. As can be seen in element 304, entries relating to change number 7777 and 8888 correspond to similar organizations (i.e., verizon.com) and organization units (i.e., People). Entries related to change numbers 7777 and 8888, however, have different vzeid numbers (i.e., 12345678, for change number 7777; and 12345679, for change number 8888). Distinguished name attributes and values are not limited to those depicted on FIG. 3. Those familiar with LDAP will understand the other attributes and values that may be used for organizing and searching within database 112 accessible via LDAP servers 102.

Element 306 provides a change time. The change time is the time in which a particular entry stored within database 112 is changed, e.g., added, modified, and deleted. The time for the change can be represented in any format for distinguishing a time or time/date combination. Because the change events are listed sequentially, according to the occurrence of change events, the change times may also be listed sequentially. Change events may also occur at the same time, in some examples. Change events that occur at the same may be listed before, or after, the change event occurring at the same time. The listing of change events within a change log may be configurable by the user of the LDAP server.

Change type 308 is a designation of the type of change occurring to information changed within database 112. FIG. 3, in general, and entry 308, in particular, depicts change number 7777 having been modified and change number 8888 having been deleted. Change types, however, are not limited to the types of changes shown on FIG. 3. Those familiar with LDAP will understand the many and various types of changes that may occur to information within database 112 accessible via the LDAP Server 102.

Change 310 is the actual change that has occurred in each respect change event. As an example, depicted in element 310 on FIG. 3, the common name (CN) attribute has been replaced with "John Doe" for change number 7777. Thus, the change event represented by change number 7777 now has a change number represented by the attribute "John Doe." As shown on FIG. 3, entries within the change log can have one, or more than one, changes associated with a particular change number. Change number 7777, for example, is replacing the common name, and also adding a mobile number (e.g., adding mobile number 555-555-5555).

FIG. 1 depicts system 100 including a single LDAP Server 102 having a single database 112. In alternative examples, system 100 may include more than one LDAP Server 102 having more than one database 112. Further, alternative examples may have one or more LDAP Servers 102 that communicate with various databases 112, located both internally and externally to LDAP Servers(s) 102.

In the alternative examples including more than one LDAP server 102, a load balancer 120 may be used to distribute workloads (e.g., processes) across multiple LDAP servers 102. Load balancer 120 may be a server, or other computing device used to balance loads across servers. Load balancer may be used to optimize resources among multiple LDAP servers, to provide reliability through redundancy of the servers, etc. In embodiments of system 100 including a load balancer, network and the LDAP Server 102 may communicate through load balancer. In other examples, however, network 114 may communicate directly with LDAP Server 102, irrespective of whether load balance is used.

System 100 includes an event-triggered service (ETS) System 110 to assist in searching the database 112 for change events and transmitting notifications of such change events to communication device 108. The ETS System 110 may reside on an intranet, for example, the ETS System 110 may be a corporate or enterprise ETS System 110. ETS Servers of this example may search public databases 112 accessible by LDAP servers, as well as non-public databases 112, e.g., databases housed on corporate or enterprise LDAP servers. Alternatively, ETS System 110 may be a public ETS System 110, such as an ETS System 110 accessible by the Internet. The event triggered service (ETS) system is a computing device. In preferred examples, the ETS System 110 is implemented as a personal computer, a mobile device, and/or a server, although the ETS System 110 may be implemented in other form factors.

Figure 2:
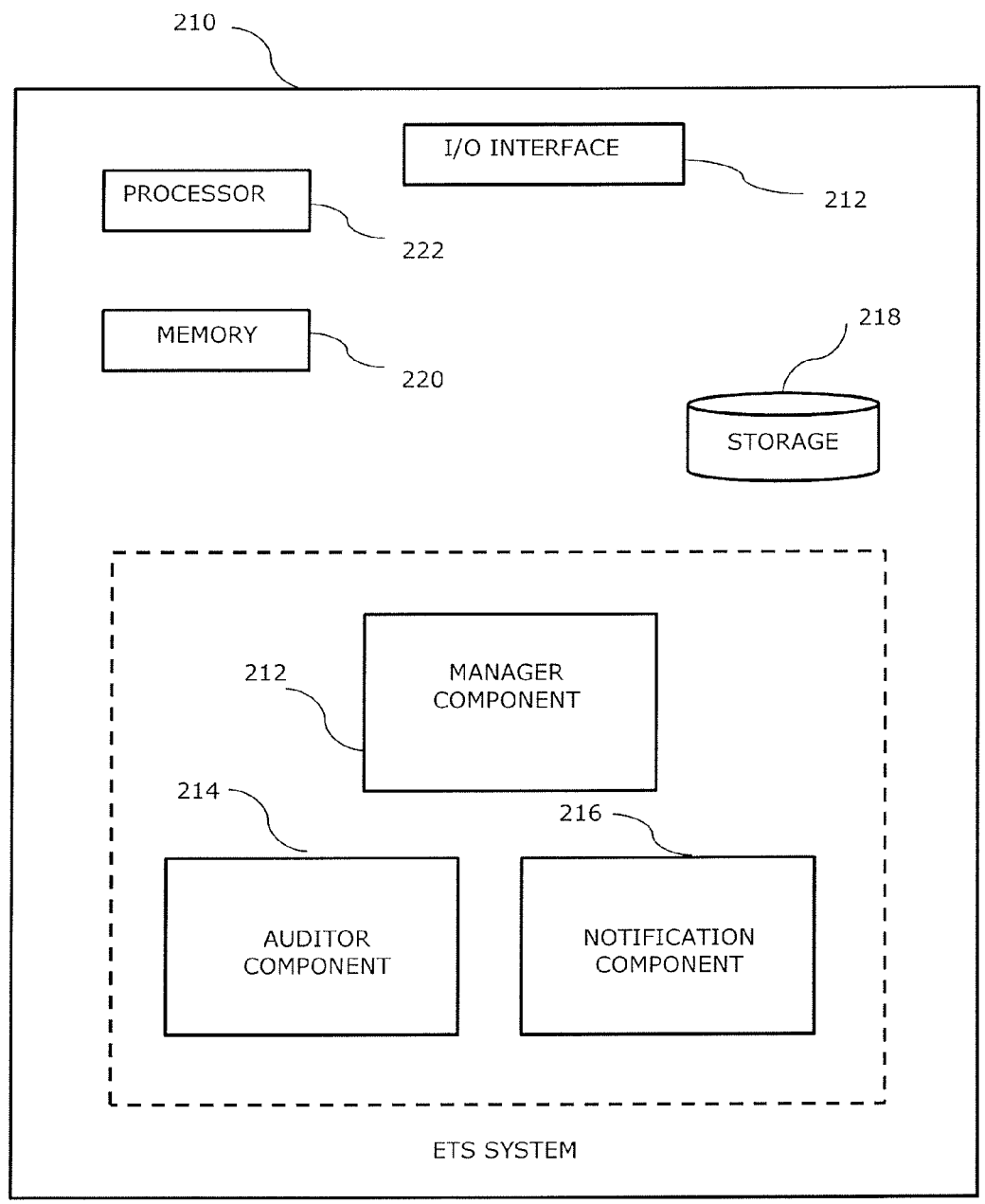
FIG. 2 is a simplified block diagram of an exemplary ETS System for persistently searching information within a database accessible via an LDAP server.

As shown on FIG. 2, the ETS system 110 includes a processor 222, a memory 220, an I/O interface 212, and storage 218. The memory 220 can include local memory, bulk storage, etc. The I/O interface 212 can comprise any device that enables the ETS system 110 to interact with one or more other computing devices using any type of communications link, for example, network 114. In general, the processor 222 executes computer program code, which is stored in the memory 220, and/or storage 218. The computer code may be representative of the functionality of components resident on the ETS system 210. These components may include, for example, a Manager Component 212, an Auditor Component 214, and a Notification Component 216 (hereinafter, the collection of the Manager Component, the Notification Component, and the Auditor Component may be referred to as ETS Components). While executing computer program code for the ETS Components, the processor 222 can read and/or write data to/from memory 220, storage 218, and/or I/O interface 24. The program code executes the processes of the functionality described herein.

The ETS system 210 can comprise any general purpose computing article of manufacture capable of executing computer program code installed thereon (e.g., a personal computer, server, handheld device, etc.). However, it is understood that the ETS system 210 is representative of various possible equivalent computing devices that may perform the processes described herein. To this extent, in embodiments, the functionality provided by the ETS system 210 can be implemented by a computing article of manufacture that includes any combination of general and/or specific purpose hardware and/or computer program code. In each embodiment, the program code and hardware can be created using standard programming and engineering techniques, respectively.

The respective functionality of the ETS Components is discussed in detail below, beginning with the functionality of the Manager Component.

According to aspects described in this disclosure, Manager Component 212 searches information contained within database 112. Manager Component 212, for example, may be configured to search for information that has been changed (e.g., added, updated, deleted, etc.) in database 112 via the LDAP Server 102. In preferred examples, when Manager Component 212 determines that information has been changed within database 112, Manager Component 212 notifies users desiring to be informed of such change events.

The Manager Component 212 may persistently search database 112 for information that has been changed. In one example, a daemon process (i.e., a computer program that runs as a background process), may be used to persistently search database 112 for information that has changed in the database. In this example, the Manager Component 212 may persistently search database 112 via the LDAP Server 102 for changes to database 112, without the necessity of a user manually performing such searches. In this example, Manager Component will notify users of a change event if the change event is consistent with parameters (e.g., change event parameters) defined by the user. In other examples, however, the Manager Component 212 may search for change events within database 112 based on the direction of user of communication device 108. The Manager Component, in this example, may require user of communication device to request information of a particular change event. In response to this request, Manager Component may perform a one-time search for this information, and provide relevant information relating to this request to communication device 108.

ETS System 110 may also include a Notification Component 216 and an Auditor Component 214. The Notification Component 216 notifies a destination, e.g., a communication device 108, when entries within database 112 have been changed (e.g., added, modified, deleted, etc.). A destination, according to aspects described in this disclosure, may include an email address, a short message service (SMS) message, or any other unique identifier or method for notifying a communication device 108 associated with a contact. Alternatively, in some examples, a destination may refer to a device not associated with a contact. For illustration purposes, the disclosure describes aspects in which Notification Component 216 determines which entries in database 112 have been changed for transmission to communication device 108. In one example, Notification Component 216 notifies users (e.g., registered users) of information that has changed in database 112, but has not yet been reported to the communication device 108. In one example, Notify Component uses I/O Interface 212 to communicate with the communication devices 108, however, Notify Component 216 may use any method or device that can be used to send information from ETS System to communication device 108.

ETS System may also include a component that ensures that notifications of change events are timely sent. As an example, ETS System may include an Auditor Component 214. Auditor Component 214 monitors the ETS System 110 for change events that have been identified for transmission to the desired user, but have not been transmitted to the communication device 108.

Auditor Component 214 identifies, as untimely, changes to information contained within the database 112 that are not transmitted to the communication device 108 within a predetermined duration of time. The predetermined duration of time for transmission of the information may be configurable by an administrator. One or more change events may not be transmitted within the predetermined time, for a variety of reasons. Such reasons may include network 114, or another network, being disabled or interrupted before transmission of the change event to the user, as well as latency, errors of components, error of users, etc. Notwithstanding the reasons for the untimely change events, Auditor Component 214 determines which change events should have been sent to the communication device 108 within a predetermined time. If Auditor Component determines that the change events have not been sent to communication device within that time, Auditor Component 214 identifies the untimely change events and transmits the identified untimely change events to the communication device 108. After transmitting the untimely change events to the communication device, Auditor Component indicates that the change events were transmitted to the communication device.

Figure 4:
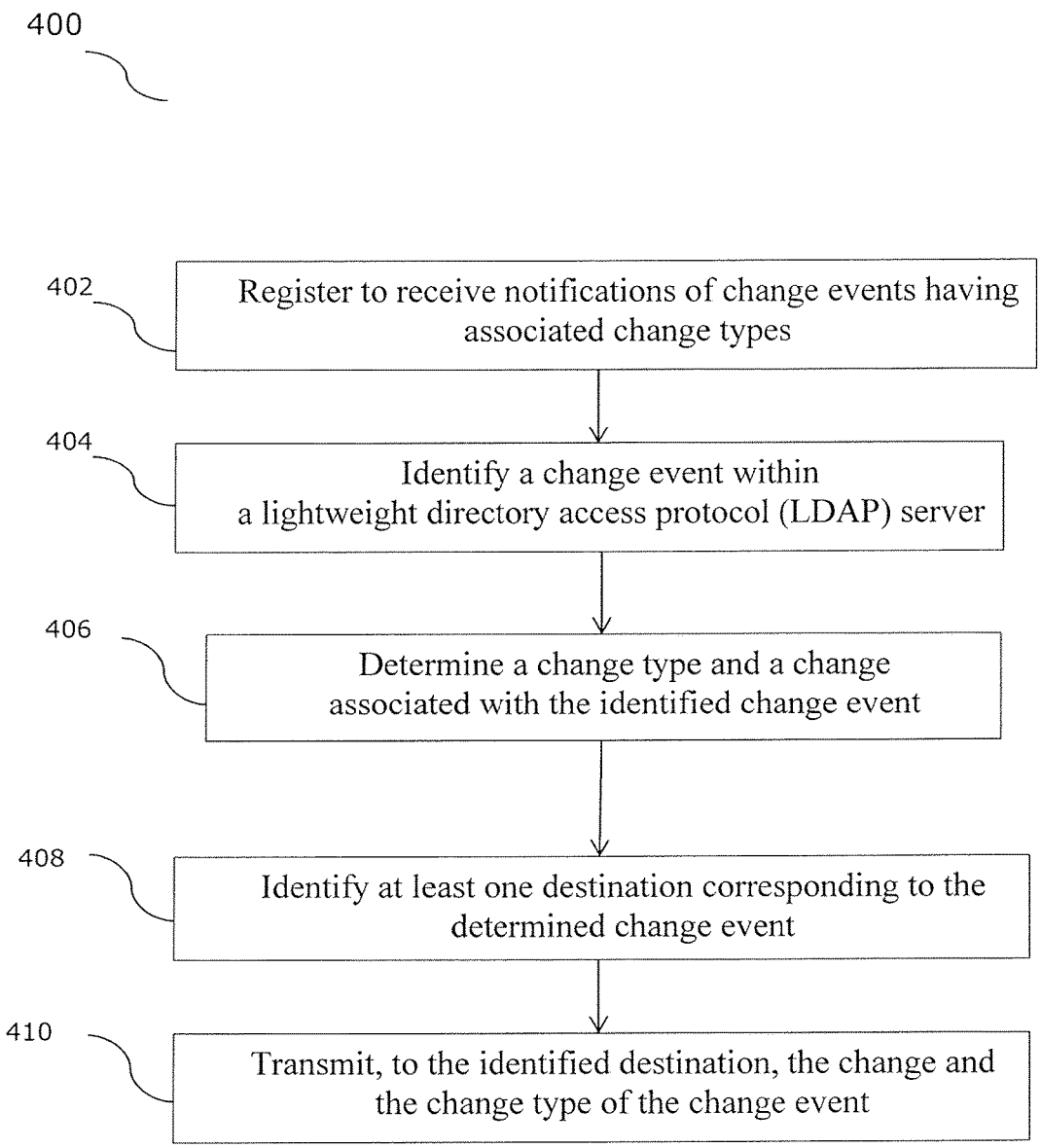
FIG. 4 is a flow diagram of an exemplary method for identifying a change event and associated change type within a database accessible via a lightweight directory access protocol (LDAP) server, and transmitting the identified change event and change type to an appropriate contact.

FIG. 4 is a flow diagram showing steps of an exemplary method for transmitting, to a user, information relating to a change event within database 112 accessible via a LDAP server 102. In a preferred example, a change event occurring within the database 112, and a change type associated with the change event, will be sent to the user.

Method 400 may begin with step 402, in which a user registers with the ETS System 110 to receive changes to database 112 (i.e., change events) accessible via LDAP server 102, as well as the types of changes corresponding to the change event. A user desiring to receive notifications of change events within database 112, for example, may be required to register with ETS system 110 to receive such notifications. In some examples, it may be preferred to require users to register with a device separate from the ETS System 110. Registering with a device separate from the ETS System permits the registration to be independent from the act of searching the database 112 for change events. Registering with devices other than the LDAP server, for example, may allow a user to register with many LDAP servers, i.e., be LDAP server agnostic.

A user name and/or a password may be required to access the LDAP Server 102 and/or database 112 of the LDAP Server. Requiring users to have a username and/or password restricts requests of change events to only those authorized to access database 112. In examples requiring the communication device 108 to provide a username and/or password for accessing change event information, communication device may be required to submit the username and/or password when registering with the ETS System 110. Other examples may allow a user to provide, or update, usernames and/or password information after registration. As indicated, requiring username and password information to obtain change event information may be necessary in some examples to protect database 112 and/or LDAP Server 102 from unauthorized users.

During registration, the user may indicate which information (e.g., change type, associated persons, contact information, time of change, etc.) the user would like Manager Component 212 to monitor for change events. Such indications may also, or in combination, be provided after registration. Thus, in some examples, registration does not require that users indicate which change event information Manager Component 212 is to monitor. Permissions for accessing information within database 112 may be implemented in ETS System 110, such that users will only be provided desired records from database 112 that particular users are authorized to access. In this example, a notification is sent to the communication device having access to a particular type of information within database 112. Such users of communication device 108 will be able to access particular information whenever any changes to the information within the database 112 have occurred. Users, however, will not have access to database 112 if the respective user is not permitted (or authorized) to receive information from the database 112. Further, the access, amount, type, etc. of notifications that the user receives is configurable, for example, according to the type of change events the user desires, as well as any other relevant information and authorization related to an entry stored within database 112.

Method 400 advances to step 404. In step 404, a change to information (i.e., change event) stored within database 112 is identified. Referencing FIGS. 1 and 2, the Manager Component 212 may search LDAP Server 102 by communicating via the network 114. The network 114 may be a public network, e.g., the Internet, or a non-public network, e.g., an intranet. The Manager Component 212 communicates to the network 114 via I/O Interface 212 of the ETS System 110. In one example, to determine if any information has been changed within database 112, the Manager Component 212 may search all records within database 112, via LDAP server 102. While searching all information within database 112, the Manager Component 212 determines which information has been changed, e.g., updated, added, or deleted within database 112. Searching the entire database 112 for change events, while inefficient, will often provide the most exhaustive search of change events within database 112.

Preferable methods of searching the information within database 112, however, may include Manager Component 212 searching the change log 104 of database 112. The change log 104 may be located in database 112, or another storage medium accessible via LDAP server 102. Further, change log 104 may be implemented in different form functions, e.g., as a flat file, a database, etc. An example of entries found in a change log 104 is depicted on FIG. 3. Change log 104 entries, as discussed above, may include information relating to the type of change event stored in database 112, the time/date of the change event, as well as other information relating to the change event. In some examples, a change log 104 may only include information relating to change events within database 112. In these examples, searching the change log may be preferable over searching all information within database 112. Searching the change log, for example, may be a more efficient method of searching for change events within database 112. By using the change log 104, the Manager Component 212 may quickly determine changes to database 112, and, as a result, identify change events within database 112.

In preferred embodiments of step 402, the Manager Component 212 continually, or persistently, searches database 112 for information that has been changed. In one example, the frequency of the searches may be configurable by the user. The Manager Component 212, for example, may be configured to search for changes to database 112 every 30 seconds, 60 seconds, 1 day, 1 week, etc. Standard frequencies for searching database 112 (e.g., searching every 20 seconds) may also be provided by the Manager Component 212. These standard frequencies may be helpful for users who do not desire to provide a personalized frequency for searching the database 112.

In preferred embodiments, the Manager Component 212 searches the change log 104 for information that has been changed within database 112. If the Manager Component 212 determines that no information is provided in the change log 104, the Manager Component 212 may conclude that there have been no new changes to database 112. In this example, the Manager Component 212 may conclude searching for changes during that particular iteration of searching. Manager Component may report that no new changes to the registered users have occurred. Thus, because this example is absent a change event, users will not be notified that a record has been changed within database 112.

Alternatively, the Manager Component 212 may determine that change events have occurred in database 112, accessible via the LDAP server 102. In this example, the Manager Component 212 may, for instance, determine that entries exist within the change log 104 indicating that a change event has occurred. In this example, the method proceeds to step 406.

In step 406, the Manager Component 212 reviews the entries within the change log 104. According to aspects of step 406, the Manager Component 212 reviews the entries of the change log 104 to determine the change type that has occurred for each respective changed event in database 112. In reviewing the entries, the Manager Component 212 may determine the change type associated with the change event within the change log. For example, as depicted on FIG. 3, change log shows, in entry 308, that change 7777 has been modified. Alternatively, as also shown on FIG. 3, entry 308 shows that change 8888 has been deleted.

The method next proceeds to step 408. After determining the change type associated with each change event provided in the change log, Manager Component 212 identifies the destination (e.g., user, contact, etc.) corresponding to the determined change type. The identified destination may correspond to a user of communication device 108 that desires to be notified of the change event and associated change type, as well as other information relating to the change event. In other examples, the destination may correspond to a device that is not associated with any particular user. In one example, a single destination (e.g., contact) may correspond to each change. Alternative examples, however, may include each change being associated with multiple destinations. Destinations may be registered users, or other users otherwise authorized to receive notifications about particular change events.

After identifying the destination associated with the change event, Manager Component 212 may determine if the destination has been notified of the change event. In one example, the Manager Component 212 may determine if a user has been notified of a particular change event via work items storage 106. In this example, the work items storage may be a database, flat file, etc., that organizes change events. Entries within the work items storage 106 may include items that Manager Component 212 has identified as a new change event, e.g., change events that have occurred but have not been transmitted to a user for notification. In some examples, entries in the work items storage 106 may correlate with entries in a change log 104, via, for example, the change number 302 (FIG. 3). The entries in the work items storage 106 may include many other attributes as well, including, but not limited to, whether the change event stored in the work items storage 106 has been, or has not been, transmitted to a user.

In one example, the ETS System 110 may search the work items storage 106 for items that have not been sent to the user. The work items storage 106 may be a database, or other device for storing information. The work items storage 106 stores change log 104 entries that will be, should be, and/or have been, sent to registered users when a change event occurs in the database 112 accessible via LDAP server 102. In some examples, the entries stored in the work items storage 106 may be ordered, corresponding to the ordering of the entries in change log 104. Alternatively, the work items may be stored sequentially, according to the time/date each record was entered into the work items storage 106. In one example, each entry stored in the work items storage 106 will have an identifier that correlates with an identifier of the same change event stored in the change log 104. The same identifier may be used for the respective change event stored in work items storage 106 and the change log 104.

The Manager Component 212 may retrieve, from the work items storage 106, the latest entry corresponding to a change event that was transmitted to the destination (e.g., user, contact, etc.) for notification. In examples wherein the entries are stored sequentially within the work items storage 106 and corresponding change log, the latest entry of the work items storage sent to a destination for notification may represent the last entry of the change log 104 that was sent to the destination for notification. In such examples, the retrieved identifier of the latest entry stored in the work items storage 106 represents the last record of the change log 104 that was sent to the destination. In preferred examples, the latest entry of the work items storage is the last entry that 106 was sent to the destination. Thus, the Manager Component 212 may search the change log 104 for the first entry having an identifier greater than the latest identifier stored in the work items storage 106. This identifier, if available, is referred to as NEXT ENTRY, and represents the next entry to be transmitted to the destination, e.g., communication device 108. This process of comparing entries within the change log 104, against entries in the work items storage 106, continues until all entries in the change log 104 (i.e., all change events) are transmitted to communication device, for example, for each respective change event.

In this example, the Manager Component 212 retrieves information corresponding to the change event of the NEXT ENTRY. Information of the NEXT ENTRY to be sent to the destination (e.g., user) includes the type of the change, the initiator of the change, the users affected by the change, as well as other available information relating to the NEXT ENTRY that is desired by a particular user. After the Manager Component 212 identifies the desired information, the Manager Component 212 creates a notification for transmitting, corresponding to the desired information. Information to be transmitted to each communication device 108 may be configurable. As an example, the user may desire to receive the change type (e.g. add, update, delete, etc.), the identity of the person and/or device who performed the change, and the user that the change relates to. According to aspects of the ETS System 110, the user may later be able to request more, or less, information than the above example.

After obtaining the desired information of the NEXT ENTRY, to be sent to communication device, ETS System adds the NEXT ENTRY to the work items storage 106. The identifier of the NEXT ENTRY, in particular, is added to the work items storage 106. Because entries are stored sequentially in the work items storage, and because the entries are designated as sent to the user (or not sent to the user), the Manager Component 212 can use the work items storage 106 to identify which entries, and in which order, notifications of the entries were sent to the users, as well as other information relating to the change events.

To notify users of change events, the Manager Component 212 may determine the type of change (e.g., add, update, delete, etc.) that was performed on an entry in the work items storage 106. The Manager Component 212 may further identify registered users, the types of change events that the registered users desire to be notified about, as well as other information. The Manager Component 212 searches the work items storage 106 for entries corresponding to information desired to be received by the registered users. As described above, the Manager Component 212 may search work items storage for entries that have not previously been transmitted to the communication device. The Manager Component 212, for example, may search entries in the work items storage for entries designated as incomplete ("incomplete" meaning the entries were not sent to a user as a notification). The Manager Component compares information included within incomplete entries against change events having information that users desire to be notified about. An incomplete entry having an "add" change, for example, may be compared to users desiring to be notified when entries are added in the database 112 accessible via the LDAP server 102.

If the work items storage 106 includes incomplete entries, the incomplete entries are transmitted to the respective users, according to step 410. The users may be notified of these entries via ETS Notification Component 216 and I/O Interface 212 of the ETS System 110, as indicated above. Entries transmitted to the users will be designated as having been sent to the users. In examples using a work items storage, entries transmitted to a user will be designated as complete. If an entry is designated as complete in the work items storage 106, no further processing will occur with respect to sending that completed entry to the communication device 108.

The Manager Component 212 continues to search the work items storage until all entries identified as incomplete are transmitted to users of communication device 108. When Manager Component 212 determines that all entries stored in the work items storage are identified as complete, the Manager Component may retrieve entries from the change log that have not been stored in the work items storage. These entries in the change log, which have not yet been stored in the work items storage, may then be stored in the work items storage. When first storing entries from the change log into the work items storage, the entries stored in the work items storage will be identified as incomplete. In preferred examples, the first new entry to be stored in the work items storage will be the next entry to be transmitted to the desired user. The first entry identified as incomplete in the work items storage, for example, may be identified as an in-progress entry. The Manager Component 212 will identify the change type of the change event designed as the in-progress entry. The Notification Component will transmit this change type and change event to the user of communication device. In preferred examples, the Manager Component 212 will traverse through the change log 104 to identify all entries to be stored in the work items storage 106, and each of the entries stored in the work items storage 106 will be transmitted to the respective desired users, via the Notification Component 216.

The Notification Component 216 can notify a user of a change to database 112 in many, and various, ways. In certain examples, users can retrieve the change event information directly from database 112, accessible via LDAP server 102. In these embodiments, users may log directly onto the LDAP server 102, or a client serviced by the LDAP server 102, to obtain information relating to the desired change events. For example, a file may be created in a user's home directory, or other directory, located on the LDAP server. In this example, the directory may include information relating to the desired change events.

In preferred embodiments, however, a user may receive a notification of a change event from communication sources that are independent of the LDAP Server 102. The Notification Component 216, in one example, may notify a user that a change has occurred using email. In this example, the communication device may receive an email whenever a change event occurs to the database in which the user is desired to be notified. In other examples, a single email may include notifications over a certain time period (e.g., the user reviews an email every day, or other time period, in which the email includes all change events from that respective time period). Because email is a communication method that is separate from the LDAP Server 102, one advantage of this example is that the user receiving notifications in this way is removed from having to directly access the LDAP Server 102. This may be advantageous for users who are not familiar with LDAP, i.e., for users who are not sophisticated in file management, etc.

A user requesting notifications of change events via email may provide, to the ETS System 110 (e.g., ETS Notification Component 216 of the ETS System 110), the user's email address, and the type of change event(s) (e.g., add, modify, delete) that the user desires to be notified about. In one example, the user may desire to receive, via email, all change events that have occurred within the database 112. In that example, the user will receive, via email, a description of all change events that have occurred within database 112. Alternatively, the user may desire to receive, via email, only change events relating to particular change types (e.g., additions). In this example, the users will only receive notifications of change events relating to predefined change events.

The Notification Component 216 may also, or in combination, notify users of change events within database 112 via file system distribution, network distribution, direct data insert, as well as other components or methods for providing notifications to users. In the file system distribution example, the changed LDAP information can be delivered to a desired user using SSH, FTP, or any other file transfer method. Users requesting to receive changes using a file system distribution method, however, may be required to provide the host name, user name, password, and destination directory where the user desires the change event information to be directed. In other examples, users receiving notifications using a network distribution method can receive such notifications using a client/server configuration, via a TCP/IP socket connection, for example. Further, clients having specialized needs may receive notifications of change events using custom modules configured to allow changes to be inserted into downstream systems using application programming interfaces. The notification methods provided above are for illustration purposes only. The provided notification methods are not intended to be limiting. Users may receive notifications of change events using any, or all, of the above-described communication methods, as well as other communication methods.

Figure 5:
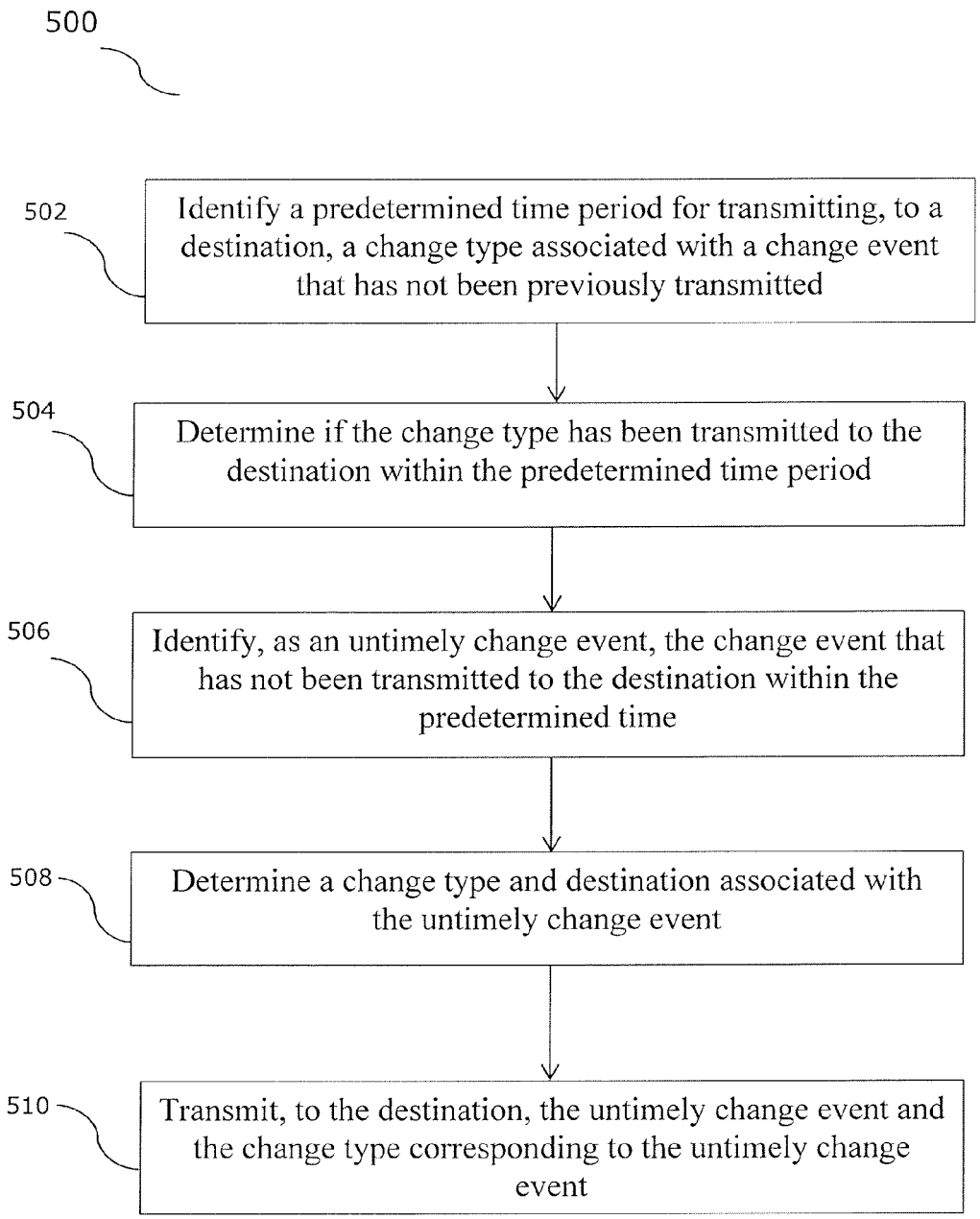
FIG. 5 is a flow diagram of an exemplary method for identifying untimely reportings of change events within a database accessible via an LDAP server, and transmitting these untimely reportings to an appropriate contact.

FIG. 5 is a flow diagram showing steps of an exemplary method for transmitting, to a user, untimely change events, as well as changes and change types corresponding to the untimely change events. In a preferred example, the change type, as well as other information relating to the untimely change event, will be transmitted to a user of the ETS System 210.

Method 500 begins with step 502, in which one or more untimely change events are identified. In one example, Auditor Component 214 will identify untimely change events. Untimely change event, according to aspects described herein, include change events that have been identified for transmission to a desired communication device 108, but, due to error, etc., have not been sent to the communication device within a predefined period of time. In one example, a user of communication device 108 may desire to receive notifications when entries have been added to the database 112 accessible by LDAP Server 102. As described above, the Manager Component 212 of ETS System 210 notifies such a user, according to a predefined schedule. The Auditor Component, according to aspects of method 500, ensures that change events are sent to the communication device within a set time duration. If a notification of a change event is not sent to the desired user according to the predefined time duration, the Auditor Component identifies these change events as untimely. In such an event, the Audit Component 214 attempts to have the identified untimely notifications sent to the communication device. Thus, in preferred examples, notifications for change events will be sent to users according to a predefined duration. However, when change events are not timely sent to users, Auditor Component will identify the untimely change events and subsequently transmit the untimely change events to the communication device 108.

Auditor Component 214 may determine if a change event reporting is untimely, for example, by checking the work items storage 106. In this example, Auditor Component may check work items storage 106 for change event entries that have been identified for notification to a user, but have not been transmitted to the user. Such change events, i.e., change events that are stored in the work items storage for notifications, but which have not yet transmitted to a user, may be considered "in progress" change events. When Auditor Component identifies change events in the work items storage that are "in progress," Auditor Component identifies the amount of time that the respective "in progress" change events have been stored in the work items storage. Change event entries that are in progress for a predefined duration of time, or longer than the predefined period of time, are considered untimely change events. The predefined duration of time, for purposes of untimely change event reportings, is a time duration indicating when the change event should be transmitted to a desired user, e.g., 30 seconds, 60 seconds, five minutes, etc., from creation of the change event. This predefined duration of time for transmitting a change event to a user may be configurable, e.g., by a user of the ETS System, etc. Alternatively, the predefined duration of time may be a time duration initially set by the ETS System for standardization purposes.

After the Auditor Component 214 identifies untimely change events, method 500 advances to step 504. In this step, Auditor Component determines the change types, and other information, corresponding to the untimely change events. Change types, as described above with reference to Manager Component 212 functionality, may include the entries in the database 112 being added, modified, or deleted. Change types, as well as the information retrieved by the Auditor Component 214 for transmission to users, however, are not limited to these types of entries. Those having skill in the LDAP will understand the many, and various, change event information that may be determined from an entry stored in the database 112.

After identifying untimely change events, and corresponding change types (e.g., addition, deletion, modification, etc.) corresponding to the untimely change events, the Auditor Component 214 identifies contacts corresponding to the untimely change events/types, according to step 506. In one example, the Auditor Component 214 may search the work items storage 106, or other sources of storage, for users of communication device 108 who desire to be notified of change events/types corresponding to the change events/types identified as being untimely. After completing step 506, Auditor Component will have identified change events that are considered untimely, change types corresponding to the untimely change events, and the users who desire to be notified of the untimely change events/types, as well as other information relating to the untimely change events.

In step 508, Auditor Component (or Notification Component, in preferred examples) transmits the identified untimely change events/types to the destinations, for example, users desiring to be notified of the particular change events/types identified as being untimely. In preferred examples, the untimely change events/types are transmitted to the identified users via Notification Component 216. The untimely change events, however, may be transmitted to desired users using any communication method. In examples wherein Auditor Component 214 uses a work items storage 106 to determine untimely change event reportings, the untimely change event that is transmitted to the user will be designated as complete after it is transmitted to a user of communication device 108. Designating the transmitted change as complete will ensure that Auditor Component 214 does not subsequently identify the transmitted change event as untimely. Change events, however, may be designated as complete before, after, or during the transmission of the change event to the desired user.

The Auditor Component 214 continues to search the work items storage 106 for untimely change events, according aspects of method 500. Untimely change events are transmitted to users of communication device 108 in a manner similar to that discussed above. If no untimely change events are identified by the Auditor Component 214 during an iteration of searching, the Auditor Component 214 does not transmit any change events to users during that particular iteration of searching. It is not until the Auditor Component

214 again identifies an untimely change event that Auditor Component will identify a change event for transmission to a user of communication device 108. In preferred examples, the Auditor Component 214 may search the work items storage 106 for untimely change events/types according to a predefined schedule (e.g., every 30 seconds, etc.). The predefined schedule may be configurable, fixed by the ETS System, or a combination of both. Alternatively, or in combination, a user may interactively control the Auditor Component to search for untimely change events/types, e.g., a user may actuate the Auditor Component 214 to search for untimely change events at times other than times according to the predefined schedule described above.

Figure 6:
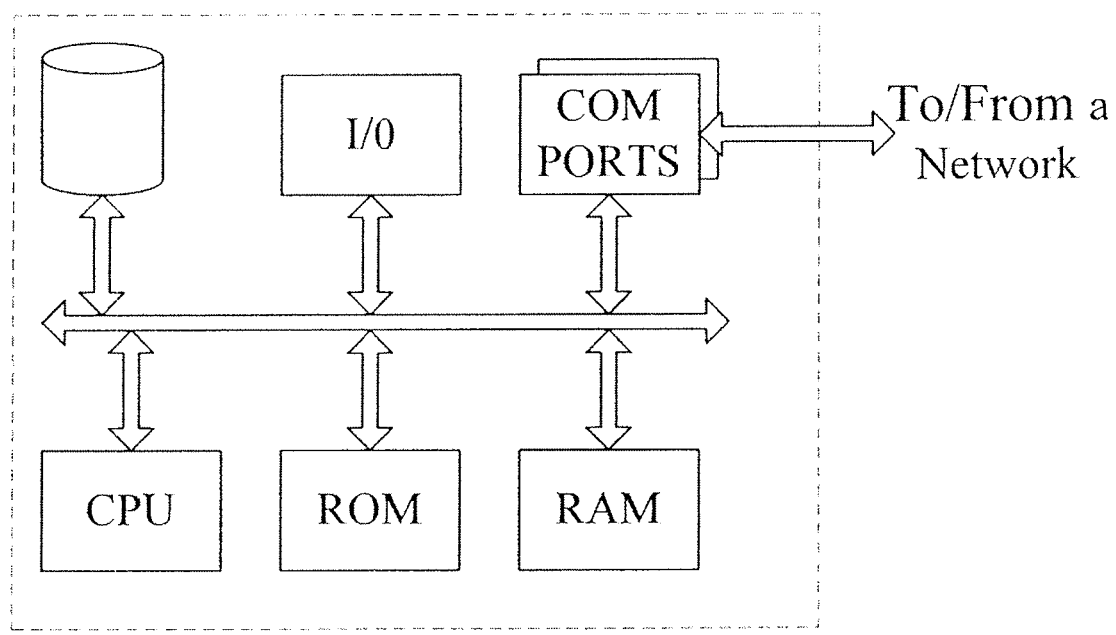
FIG. 6 is a simplified functional block diagram of a computer that may be configured as a host or server, for example, to function as the LDAP server or as the ETS System of FIG. 1.
Figure 7:
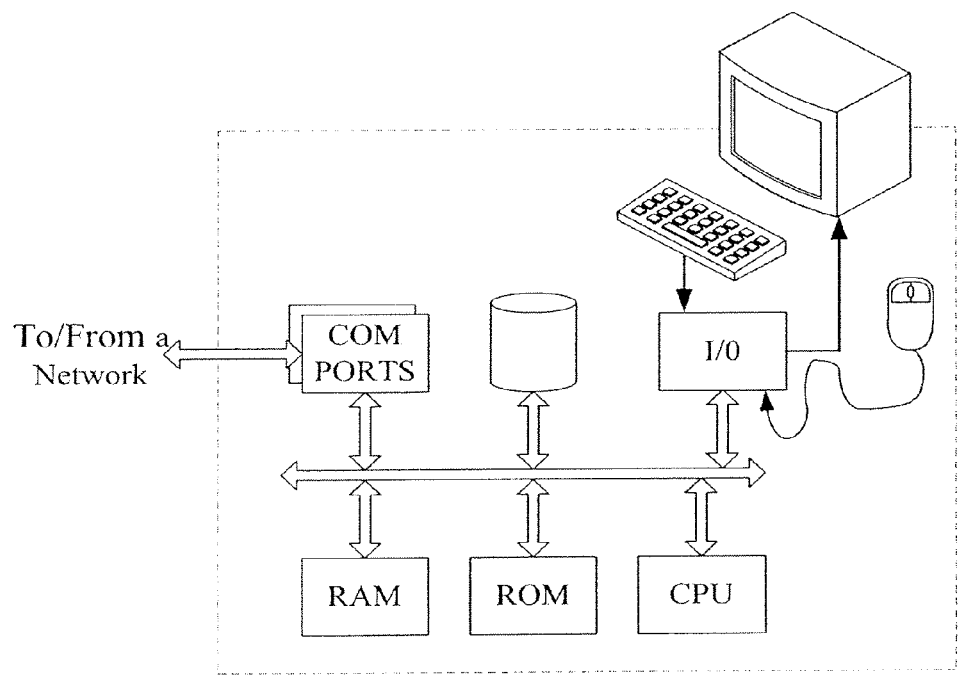
FIG. 7 is a simplified functional block diagram of a personal computer or other work station or a mobile device.

As shown by the discussion above, the functions attributed to many of the devices of FIG. 1 may be implemented by appropriate programming of general purpose network computers or user terminal equipment. FIGS. 6 and 7 provide functional block diagram illustrations of general purpose hardware platforms. FIG. 6 illustrates a network or host computer platform, as may be used to implement a server, such as the LDAP Server, ETS System, Load Balancer, etc. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A computer programmed to implement a server function, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar computer platforms, to distribute the processing load.

Hence, aspects of the methods outlined above may be embodied in programming. Program aspects of the technology may be thought of as "products" or "articles of manufacture" typically in the form of executable code and/or associated data about various stations involved in the proximate device locator service that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the server computer or into the mobile station, for example, from a another computer of the mobile network operator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible or non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed:

1. A computer implemented method, comprising:
    searching a change log, accessible via a lightweight directory access protocol (LDAP) server, to identify one or more change events corresponding to changes to entries in a data repository, wherein each change event stored in the change log includes a corresponding identifier, wherein the change log is different from the data repository, and wherein searching the change log comprises:
        searching the change log for a particular change event having a corresponding identifier numerically greater than a latest identifier stored in a storage;
        storing the particular change event in the storage, wherein the storage stores a plurality of change events and, for each change event, the corresponding identifier and an indication of whether information associated with the change event has been transmitted to a destination associated with the change event, wherein the change events stored in the storage are stored in a sequential order based on a date and time that each change event was stored in the storage, and wherein the storage is different from the change log and the data repository; and
    searching the storage to determine whether each of the one or more change events has been previously transmitted to a destination;
    for each of the one or more change events that has not been previously transmitted:
        determining a change type associated with the change event that has not been previously transmitted;
        searching a second storage that stores information associated with a plurality of destinations to identify a destination that is associated with the determined change type; and
        transmitting, to the identified destination, a message containing information including at least the change type and the associated change event that has not been previously transmitted.

2. The method of claim 1, wherein transmitting the message further comprises creating a file on the LDAP server, wherein the file is accessible by a device at the destination and wherein the file includes the one or more change events that have not been previously transmitted and the change type associated with the one or more change events.

3. The method of claim 1, wherein transmitting the message further comprises transmitting the message to the identified destination using a format independent of the LDAP.

4. The method of claim 3, wherein transmitting the message to the identified destination using a format independent of the LDAP includes transmitting, to the identified destination, the message via electronic mail, short message service (SMS) text messaging, multimedia messaging service (MMS) messaging, or instant messaging (IM).

5. The method of claim 3, wherein transmitting the message to the identified destination using a format independent of the LDAP includes sending, to the identified destination, the message via a file transfer method including at least a secure shell (SSH) or file transfer protocol (FTP) method.

6. The method of claim 1, wherein searching the change log further comprises:
    polling the change log, on a periodic basis, to identify the one or more change events corresponding to changes to the entries in the data repository.

7. The method of claim 1, further comprising:
    identifying a predetermined time period for transmitting, to the identified destination, the message containing the information;
    determining if the message has been transmitted to the identified destination within the predetermined time period;
    identifying, as an untimely change event, the one or more change events associated with the message that has not been transmitted to the identified destination within the predetermined time period;
    determining the change type and the destination associated with the untimely change event; and
    transmitting, to the identified destination, the untimely change event and the change type associated with the untimely change event.

8. An event service system, comprising:
    a memory; and
    at least one processor, wherein the at least one processor is configured to:
        search a change log, accessible via a lightweight directory access protocol (LDAP) server, to identify one or more change events corresponding to changes to entries in a data repository, wherein each change event stored in the change log includes a corresponding identifier, wherein the change log is different from the data repository, and wherein, when searching the change log, the at least one processor is configured to:

search the change log for a particular change event having a corresponding identifier numerically greater than a latest identifier stored in a storage;

store the particular change event in the storage, wherein the storage stores a plurality of change events and, for each change event, the corresponding identifier and an indication of whether information associated with the change event has been transmitted to a destination associated with the change event, wherein the change events stored in the storage are stored in a sequential order based on a date and time that each change event was stored in the storage, and wherein the storage is different from the change log and the data repository; and search the storage to determine whether each of the one or more change events has been previously transmitted to a destination;

for each of the one or more change events that has not been previously transmitted:

determine a change type associated with the identified change event that has not been previously transmitted;

search a memory that stores information associated with a plurality of destinations to identify a destination that is associated with the determined change type; and transmit, to the identified destination, a message containing information including at least the change type and the associated change event that has not been previously transmitted.

9. The event service system of claim 8, wherein the at least one processor is further configured to create a file on the LDAP server, wherein the file is accessible at the destination and includes the one or more change events that have not been previously transmitted and the change type associated with the one or more change events.

10. The event service system of claim 8, wherein the at least one processor is further configured to transmit the message to the identified destination using a format independent of the LDAP.

11. The event service system of claim 10, wherein, when transmitting the message to the identified destination using a format independent of the LDAP, the at least one processor is further configured to transmit, to the identified destination, the message via electronic mail, short message service (SMS) text messaging, multimedia messaging service (MMS) messaging, or instant messaging (IM).

12. The event service system of claim 10, wherein, when transmitting the message to the identified destination using a format independent of the LDAP, the at least one processor is further configured to send, to the destination, the message via a file transfer method including at least a secure shell (SSH) or file transfer protocol (FTP) method.

13. The event service system of claim 8, wherein, when searching the change log, the at least one processor is further configured to poll, on a periodic basis, the change log to identify the one or more change events corresponding to changes to the entries in the data repository.

14. The event service system of claim 8, wherein the at least one processor is further configured to:

identify a predetermined time period for transmitting, to the identified destination, the message containing the information;

determine if the message has been transmitted to the identified destination within the predetermined time period;

when the message has not been transmitted to the identified destination within the predetermined time period:

identify, as an untimely change event, the one or more change events associated with the message that has not been transmitted to the identified destination within the predetermined time period;

determine the change type and the destination associated with the untimely change event; and transmit, to the identified destination, the untimely change event and the change type associated with the untimely change event.

15. Non-transitory, tangible, computer-readable storage media containing a plurality of instructions configured to cause a computer system to:

search a change log, accessible via a lightweight directory access protocol (LDAP) server, to identify one or more change events corresponding to changes to entries in a data repository, wherein each change event stored in the change log includes a corresponding identifier, wherein the change log is different from the data repository, and wherein, when searching the change log, the instructions are further configured to cause the computer system to:

search the change log for a particular change event having a corresponding identifier numerically greater than a latest identifier stored in a storage;

store the particular change event in the storage, wherein the storage stores a plurality of change events and, for each change event, the corresponding identifier and an indication of whether information associated with the change event has been transmitted to a destination associated with the change event, wherein the change events stored in the storage are stored in a sequential order based on a date and time that each change event was stored in the storage, and wherein the storage is different from the change log and the data repository; and search the storage to determine whether each of the one or more change events has been previously transmitted to a destination;

for each of the one or more change events that has not been previously transmitted:

determine a change type associated with the change event that has not been previously transmitted;

search the storage to identify a destination that is associated with the determined change type; and transmit, to the identified destination, a message containing information including at least the change type and the associated change event that has not been previously transmitted.

16. The non-transitory media of claim 15, wherein the instructions are further configured to cause the computer system to create a file on the LDAP server, wherein the file is accessible at the destination, and wherein the file includes the one or more change events that have not been previously transmitted and the change type associated with the one or more change events.

17. The non-transitory media of claim 15, wherein the instructions are further configured to cause the computer system to transmit the message to the identified destination using a format independent of the LDAP.

18. The non-transitory media of claim 17, wherein the instructions configured to cause the computer system to transmit the message to the identified destination using the format independent of the LDAP further include instructions configured to cause the computer system to transmit the message to the identified destination using a format independent of the LDAP includes transmitting, to the identified destination, the message via electronic mail, short message service (SMS) text messaging, multimedia messaging service (MMS) messaging, or instant messaging (IM).

19. The method of claim 1, wherein the change log is stored at the data repository.

20. The event service system of claim 8, wherein the change log is stored at the data repository.

* * * * *